Dec. 15, 1953   F. MEINIG   2,662,762
PRECISION BALANCE
Filed April 15, 1950   2 Sheets-Sheet 1
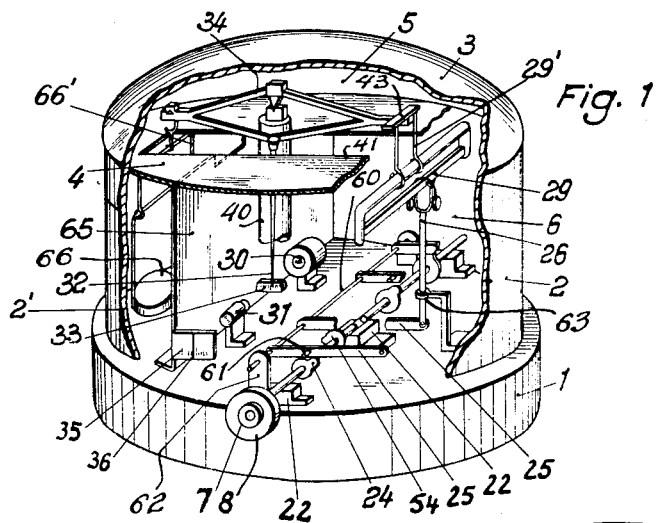
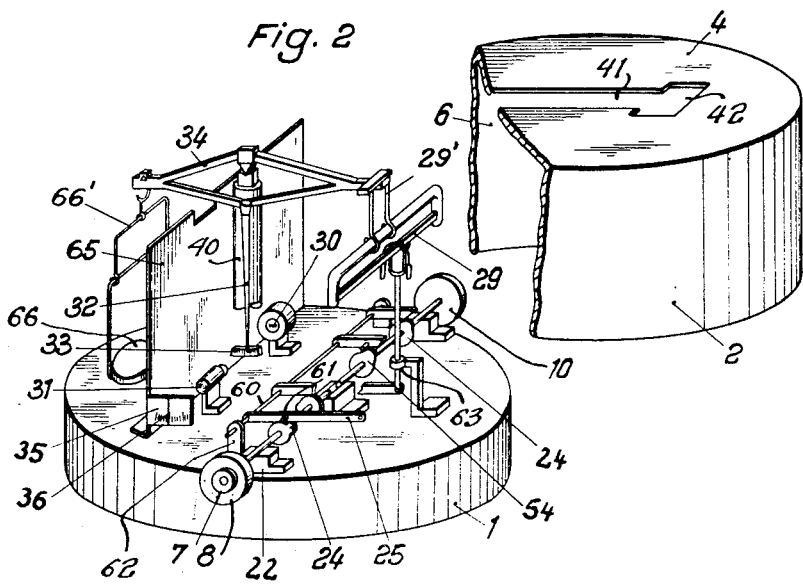
Inventor:
Friedrich Meinig Dec. 15, 1953   F. MEINIG   2,662,762
PRECISION BALANCE
Filed April 15, 1950   2 Sheets-Sheet 2
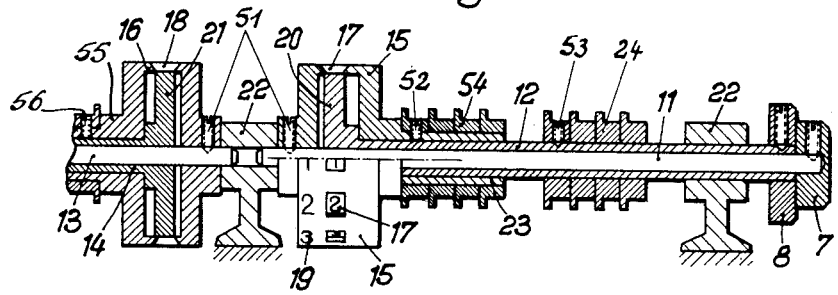
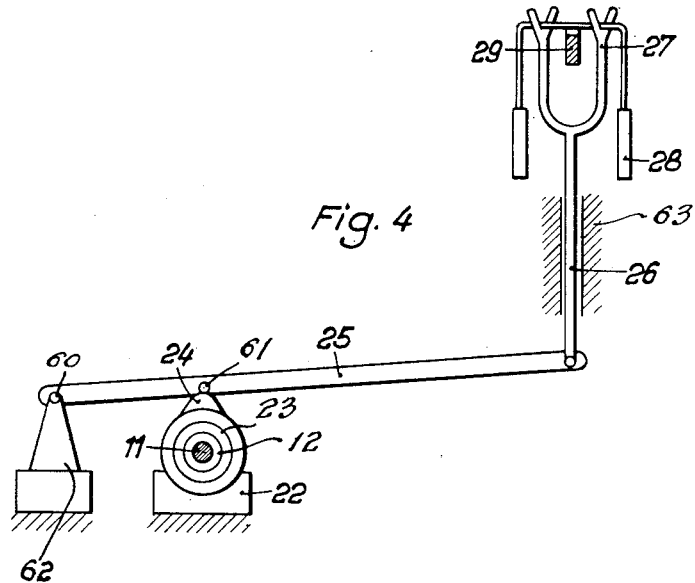
Inventor:
Fredrick Meinig

UNITED STATES PATENT OFFICE 2,662,762

PRECISION BALANCE

Friedrich Meinig, Gottingen, Germany

Application April 15, 1950, Serial No. 156,098

Claims priority, application Germany August 18, 1949

3 Claims. (Cl. 265—54)

The present invention relates to precision balances and more particularly to a balance which is adapted to have the poises thereof mechanically applied.

One of the objects of the present invention is to provide a balance with a casing which can be easily removed.

Another object of the present invention is to provide a balance whose weighing mechanism is not rendered inoperative by removal of the casing.

A further object of the present invention is to provide a balance with a mechanical poise applying means which is of a simple construction and easy to operate.

An additional object of the present invention is to provide a balance in which the weighing mechanism is protected against electrical charges as well as against air currents and temperature changes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of a balance constructed in accordance with the present invention, parts of the structure of Fig. 1 being broken away for the sake of clarity;

Fig. 2 is a view of the structure of Fig. 1 with the casing of the present invention shown spaced from the base on which it rests, this casing being exploded in Fig. 2 and having parts thereof broken away;

Fig. 3 is a fragmentary sectional view on an enlarged scale of part of the poise applying mechanism shown in Figs. 1 and 2; and Fig. 4 is a partly diagrammatic side elevational view, on an enlarged scale, of a poise applying mechanism constructed in accordance with the present invention and shown in Figs. 1–3.

Referring now to Figs. 1 and 2 of the drawings, it will be seen that the precision balance of the invention includes a base plate 1 which may have a circular, oval, or polygonal shape. A casing 2 rests on the base plate 1, this casing 2 being open at its bottom and having a side wall whose bottom edge engages the top face of the base plate 1. The casing 2 is closed at its top by a dish-shaped lid 3 which has its convex face directed upwardly. A horizontal partition wall 4 is fixed to the side wall of casing 2, as shown in Fig. 2, although this partition wall 4 could also be fixed to the lid 3, if desired. Also, the casing 2 is provided with doors 2' which give access to the interior of the casing at the part thereof located beneath horizontal partition wall 4. This partition wall 4 provides the casing into an upper chamber located above wall 4 and beneath lid 3 and a lower chamber located beneath wall 4 and above base plate 1.

A poise applying means is provided to apply poises of a predetermined weight to the balance beam described below, and this poise applying means includes concentric knobs 7 and 8 located on one side of the apparatus and a pair of identical concentric knobs located on the opposite side of the apparatus, only the knob 10 of the latter pair of knobs being shown in the drawings in Fig. 2 thereof. As is evident from Fig. 3, the knob 7 is fixed to a shaft 11, and the knob 8 is fixed to a tubular shaft 12 through which the shaft 11 slidably extends so that the shaft 11 is turnable in the shaft 12. A shaft 13 identical with shaft 11 is fixed at its outer end to a knob identical with knob 7 and located at the opposite side of the apparatus, and a tubular shaft 14, identical with shaft 12 and through which shaft 13 slidably extends is fixed at its outer end to the knob 10.

A cylindrical hollow member 15 is fixed at its left end, as viewed in Fig. 3, to the shaft 11, and an identical cylindrical hollow member 16 is fixed at its right end, as viewed in Fig. 3, to the shaft 13. The member 15 is formed with an annular row of openings 17, and the member 16 is formed with an identical annular row of openings 18. An annular row of numbers 19 are located on the outer surface of member 15 respectively beside the openings 17, and an identical row of numbers are located on the outer surface of member 16 respectively beside the openings 18. The hollow shaft 12 is fixed at its left end, as viewed in Fig. 3, to a numbered wheel 20 which is turnable within the hollow member 15, the right hub of member 15, as viewed in Fig. 3, slidably engaging the outer surface of shaft 12. The numbers on wheel 20 are visible through the openings 17, and it is evident that the numbers 19 together with the numbers visible through openings 17 indicate the angular relationship of shafts 11 and 12. A numbered wheel 21, identical with wheel 20, is fixed to the right end of tubular shaft 14, as viewed in Fig. 3, and the numbers of wheel 21 are visible through openings 18 to cooperate with the numbers on the outer surface of member 16 to indicate the angular relationship between shafts 13 and 14. Three bearings 22 are fixed to the top face of base plate 1, and the two outermost bearings 22 turnably support the hollow shafts 12 and 14, respectively, while the intermediate bearing 22 turnably supports the inner ends of shafts 11 and 13, as is evident from Figs. 1–3 of the drawings.

As is shown most clearly in Fig. 4, cams 24 fixed to shaft 12 cooperate respectively with linkages 25, 26 to change the inclination of link 25 thereof in accordance with the angular position of a particular cam 24. The link 25 is pivotally connected at its right hand end, as viewed in Fig. 4, to the bottom end of link 26 which terminates at its top end in a U-shaped member 27 whose top free ends are bifurcated. It is to be understood that a plurality of linkages 25, 26 are provided and respectively cooperate with a plurality of cams. The bifurcated ends of members 27 respectively cooperate with a plurality of substantially U-shaped poises 28 adapted to selectively rest on the upper edge of bar 29 of a poise carrying means, only one of the poises 28 being shown in the drawings. The bar 29 extends between the opposite legs of a substantially U-shaped member of the poise carrying means, as is clearly evident from Figs. 1 and 2, and a supporting means 29' is provided to support the poise carrying means, as will be described below.

A light source means 30 is fixed to the top face of base plate 1, and an objective means 31 cooperates with the light source means 30 to project an image of the lower end portion of pointer 32, which carries a reading scale 33 at its bottom end and which is fixed at its top end to the balance beam 34, onto the matted glass plate 35 which is provided with a reading mark 36. The light source means 30 and the objective means 31 are respectively located on opposite sides of the lower end portion of pointer 32 and are in alignment with each other.

An upwardly projecting support 40 is fixed to the top face of base plate 1 and extends upwardly therefrom, this support 40 tiltably supporting, at its top end, the balance beam 34, as shown in Figs. 1 and 2. The upper end portion of the support 40 extends through an oblong aperture 41 formed in the horizontal partition wall 4, and the balance beam 34 is located within the upper chamber 5 located between wall 4 and lid 3. The opposite ends of aperture 41 are enlarged as is indicated at 42 in Fig. 2. A plate 43 is fixed to the right end of balance beam 34, as viewed in Fig. 1, and forms part of the supporting means 29' from which the poise carrying means is suspended, this supporting means 29' extending downwardly through the enlarged end 42 of aperture 41 which is shown in Fig. 2.

As is evident from Fig. 3, the inner ends of hollow cylindrical members 15 and 16 are respectively fixed to the shafts 11 and 13 by the set screws 51. A number of set screws 52 engage the hub portion of member 15, but do not engage the shaft 12. The set screws 53 respectively fix the cams 24 to the outer surface of shaft 12, only one of these set screws 53 being shown in Fig. 3. A plurality of cams 54 are fixed to the outer surface of the elongated hub of member 15 by the set screws 52, only one of the set screws 52 being shown in Fig. 3. The hollow cylindrical member 16 is provided with an elongated hub portion 55 through which the shaft 14 slidably extends, and a number of cams similar to cams 54 are fixed to the outer surface of hub portion 55 by set screws 56, one of which is shown at the left end of Fig. 3. A second group of cams 24 are arranged on the shaft 14, so that a number of cams are located along the axes of shafts 11 and 13, and all of these cams extend in different angular directions, respectively, as is indicated in Figs. 1 and 2 where some of the cams 24 and 54 are shown.

A pivot shaft 60 extends through the left ends of links 25, as viewed in Figs. 1, 2 and 4, to pivotally support these links 25, and a pin 61 is fixed to each link 25 to be engaged by one of the cams 24 or 54 associated with each link 25. The pivot shaft 60 is carried by a pair of brackets 62 fixed to the top face of base plate 1, and tubular guides 63 are also fixed to the top face of base plate 1, only one of these guides 63 being shown in Figs. 1 and 2. The links 26 respectively extend slidably through the guides 63 so as to be guided for vertical movement during turning of links 25 about the axis of shaft 60.

A vertical partition wall 65 carries the glass plate 35 and is surrounded by the casing 2 to subdivide the lower chamber 6, located beneath partition wall 4, into a poise applying chamber located to the right of partition wall 65, as viewed in Figs. 1 and 2, and a pan chamber located to the left of partition wall 65, as viewed in Figs. 1 and 2. A pan 66, adapted to carry a load to be weighed, is located in the pan chamber and is suspended on a supporting means 66' which is fixed to the left end of balance beam 34, as viewed in Figs. 1 and 2, this supporting means 66' extending downwardly from the balance beam 34 through the left end of aperture 41, as viewed in Fig. 1. The supporting means 66' is hereinafter referred to as the first supporting means, and the supporting means 29' is hereinafter referred to as the second supporting means. The doors 2' are located at the pan chamber so that a load to be weighed may be placed on the pan 66 through the doors 2'.

The above described structure operates as follows:

Before a load is weighed, the entire casing 2 may be removed from the apparatus so that all parts of the precision balance will assume the temperature of the surrounding atmosphere. Then the load to be weighed is placed on the pan 66 and the doors 2' are closed. It will be noted that the knobs 7 and 8 at one side of the apparatus and the pair of knobs at the opposite side of the apparatus are located outside of the casing 2 so as to be accessible while the casing is on the base plate 1. As was mentioned above, all of the cams 24 and 54 extend in different angular directions, and they are positioned so that at any given angular relationship of shafts 11 and 12 as well as shafts 13 and 14 only a desired poise or poises will rest on the bar 29 of the poise carrying means, all of the remaining poises being raised from the bar 29. Since the cams 54 are fixed to the tubular member 15 which is in turn fixed to the shaft 11, it is evident that only these cams 54 will be turned when knob 7 is turned to turn shaft 11, and in the same way only the group of cams fixed to member 16 will turn when the knob fixed to shaft 13 is turned. On the other hand, the cams 24 are fixed to the shafts 12 and 14 so that only these cams 24 will be turned when the knobs 8 and 10 are turned. Thus, by independent rotation of the pairs of knobs at the opposite sides of the apparatus, one or more poises may be lowered to rest on the bar 29, and the numbers appearing through the openings 17 and 18 as well as the numbers on the members 15 and 16 indicate the weight of the poises resting on the bar 29, since these numbers cooperate to indicate the angular relationship between the shafts 11 and 12, on the one hand, and the shafts 13 and 14, on the other hand. Thus, the operator may read the weight of the poises resting on bar 29 when the beam 34 is balanced.

Of course, it is necessary to indicate weight increments between the particular weights of the poises, and the pointer 32 serves this purpose. Thus, when the best possible balance is obtained by turning of the knobs, the angular position of pointer 32 will be indicated on plate 35, and the line 36 cooperates with the image of reading scale 33 to indicate the weight to be added to the reading of members 15 and 16.

It should be noted that the horizontal partition wall 44 protects the balance beam 34 from large temperature changes and vertically moving air currents, as well as from electrostatic charges, and the vertical partition wall 65 protects the apparatus in the poise applying chamber from the same unfavorable phenomena.

What I claim as new and desire to secure by Letters Patent is:

1. A balance, comprising in combination, a base plate; an upwardly projecting support mounted on said base plate; a balance beam supported by said upwardly projecting support at the upper end thereof and extending in substantially horizontal direction; a pan adapted to carry a load to be weighed; first supporting means suspended from one end of said balance beam so as to extend in downward direction and supporting at the lower end thereof said pan; poise carrying means for supporting a plurality of poises; second supporting means suspended from said balance beam at the other end thereof so as to extend in downward direction and supporting at the lower end thereof said poise carrying means; poise applying means mounted on said base plate substantially below said poise carrying means for applying a desired poise to said poise carrying means; a counting device connected to said poise applying means and allowing to read the poises applied by said poise applying means to said poise carrying means; cam means forming part of said poise applying means; linking means forming part of said poise applying means and cooperating with said cam means; a casing being closed on the top and having a side wall, said casing being open at the bottom so as to have a bottom edge, said casing being removably placed with said bottom edge on said base plate and entirely enclosing said upwardly projecting support, said balance beam, said pan, said poise carrying means and said poise applying means; a substantially horizontal partition wall extending in said casing and forming within the same an upper and a lower chamber, said horizontal partition wall being provided with an oblong aperture, said upwardly projecting support projecting through said aperture into said upper chamber so as to support said balance beam within said upper chamber, said first supporting means and said second supporting means projecting through said aperture downwardly so as to support said pan and said poise carrying means in said lower chamber of said casing; and an operating member for said cam means projecting through an opening in said side wall of said casing outwardly so as to permit application of poises to said poise carrying means without removal of said casing.

2. A balance, comprising in combination, a base plate; an upwardly projecting support mounted on said base plate; a balance beam supported by said upwardly projecting support at the upper end thereof and extending in substantially horizontal direction; a pan adapted to carry a load to be weighed; first supporting means suspended from one end of said balance beam so as to extend in downward direction and supporting at the lower end thereof said pan; poise carrying means for supporting a plurality of poises; second supporting means suspended from said balance beam at the other end thereof so as to extend in downward direction and supporting at the lower end thereof said poise carrying means; poise applying means mounted on said base plate substantially below said poise carrying means for applying a desired poise to said poise carrying means; a counting device connected to said poise applying means and allowing to read the poises applied by said poise applying means to said poise carrying means; cam means forming part of said poise applying means; linking means forming part of said weight applying means and cooperating with said cam means; a casing being closed on the top and having a side wall, said casing being open at the bottom so as to have a bottom edge, said casing being removably placed with said bottom edge on said base plate and entirely enclosing said upwardly projecting support, said balance beam, said pan, said poise carrying means and said poise applying means; a substantially horizontal partition wall extending in said casing and forming within the same an upper and a lower chamber, said horizontal partition wall being provided with an oblong aperture, said upwardly projecting support projecting through said aperture into said upper chamber so as to support said balance beam within said upper chamber, said first supporting means and said second supporting means projecting through said aperture downwardly so as to support said pan and said poise carrying means in said lower chamber of said casing; a substantially vertical partition wall connected to said base plate and dividing said lower chamber so as to form a pan chamber and a poise applying chamber, said pan chamber containing said pan, said poise applying chamber containing said poise carrying means and said poise applying means; an operating member for said cam means projecting through an opening in said side wall of said casing outwardly so as to permit application of poises to said poise carrying means without removal of said casing; a pointer projecting downwardly from said balance beam, said pointer being arranged in said poise applying chamber and having a lower end portion movable along a predetermined path during tilting of said balance beam; and light source means mounted on said base plate inside said poise applying chamber on one side of said lower end portion of said pointer for illuminating said path so as to direct a beam of light against said lower end portion of said pointer.

3. A balance, comprising in combination, a base plate; an upwardly projecting support mounted on said base plate; a balance beam supported by said upwardly projecting support at the upper end thereof and extending in substantially horizontal direction; a pan adapted to carry a load to be weighed; first supporting means suspended from one end of said balance beam so as to extend in downward direction and supporting at the lower end thereof said pan; poise carrying means for supporting a plurality of poises; second supporting means suspended from said balance beam at the other end thereof so as to extend in downward direction and supporting at the lower end thereof said poise carrying means; poise applying means mounted on said base plate substantially below said poise carrying means for applying a desired poise to said poise carrying means; a counting device connected to said poise applying means and allowing to read the poises applied by said poise applying means to said poise carrying means; cam means forming part of said poise applying means; linking means forming part of said poise applying means and cooperating with said cam means; a casing being closed on the top and having a side wall, said casing being open at the bottom so as to have a bottom edge, said casing being removably placed with said bottom edge on said base plate and entirely enclosing said upwardly projecting support, said balance beam, said pan, said poise carrying means and said poise applying means; an operating member for said cam means projecting through an opening in said side wall of said casing outwardly so as to permit application of poises to said poise carrying means without removal of said casing; a pointer projecting downwardly from said balance beam, said pointer being arranged in said poise applying chamber and having a lower end portion movable along a predetermined path during tilting of said balance beam; light source means mounted on said base plate inside said poise applying chamber on one side of said lower end portion of said pointer for illuminating said path so as to direct a beam of light against said lower end portion of said pointer; objective means arranged on the other side of said lower end portion of said pointer inside said poise applying chamber for picking up said beam of light and projecting an image of said lower end portion of said pointer; and a glass plate connected to said vertical partition wall and being in substantial alignment with said objective to receive said image so that an image of said lower end portion of said pointer is formed on said glass plate.

FRIEDRICH MEINIG.

References Cited in the file of this patent

UNITED STATES PATENTS

| Number | Name | Date |
|---|---|---|
| Re. 22,297 | Sullivan | Apr. 6, 1943 |
| 1,089,826 | Emerson | Mar. 10, 1914 |
| 1,345,180 | Heusser | June 29, 1920 |
| 1,484,358 | Norton | Feb. 19, 1924 |
| 1,562,936 | Ainsworth | Nov. 24, 1925 |
| 1,829,316 | Van Berkel | Oct. 27, 1931 |
| 2,081,252 | Seederer | May 25, 1937 |
| 2,192,905 | Gattoni | Mar. 12, 1940 |
| 2,291,628 | Ising | Aug. 4, 1942 |
| 2,302,402 | Sullivan | Nov. 15, 1942 |
| 2,355,421 | Clewell et al. | Aug. 8, 1944 |
| 2,388,912 | Haferl et al. | Nov. 13, 1945 |

FOREIGN PATENTS

| Number | Country | Date |
|---|---|---|
| 29,236 | Great Britain | 1913 |
| 642,912 | Germany | Mar. 24, 1937 |
| 485,311 | Great Britain | May 18, 1938 |